United States Patent [19]
Miyazaki et al.

[11] Patent Number: 5,602,698
[45] Date of Patent: Feb. 11, 1997

[54] APPARATUS FOR MOUNTING A MAGNETIC HEAD IN AN ACTUATOR ARM ASSEMBLY

[75] Inventors: Yukio Miyazaki; Takuya Amemiya, both of Kawasaki, Japan

[73] Assignee: Fujitsu Limited, Japan

[21] Appl. No.: 387,223

[22] Filed: Feb. 13, 1995

[30] Foreign Application Priority Data

Mar. 17, 1994 [JP] Japan .................... 6-047164

[51] Int. Cl.⁶ .................................................. G11B 21/16
[52] U.S. Cl. .................................................. 360/104
[58] Field of Search .................... 360/103–106, 360/97.01, 98.01

[56] References Cited

U.S. PATENT DOCUMENTS

| | | | |
|---|---|---|---|
| 4,912,583 | 3/1990 | Hinlein | 360/104 |
| 5,003,420 | 3/1991 | Hinlein | 360/104 |
| 5,012,367 | 4/1991 | Toensing | 360/104 |
| 5,140,481 | 8/1992 | Cain et al. | 360/104 |
| 5,153,794 | 10/1992 | Hinlein | 360/104 |
| 5,172,286 | 12/1992 | Jurgenson | 360/104 |
| 5,187,626 | 2/1993 | Hopkins et al. | 360/104 |
| 5,191,705 | 3/1993 | Toensing | 360/104 |
| 5,262,911 | 11/1993 | Cain et al. | 360/104 |
| 5,390,058 | 2/1995 | Yamaguchi | 360/104 |
| 5,461,524 | 10/1995 | Jurgenson | 360/104 |

FOREIGN PATENT DOCUMENTS

| | | |
|---|---|---|
| 58-089900 | 5/1983 | Japan . |
| 3-176877 | 7/1991 | Japan .................... 360/104 |
| 4-319581 | 11/1992 | Japan .................... 360/104 |

*Primary Examiner*—Jefferson Evans
*Attorney, Agent, or Firm*—Greer, Burns & Crain, Ltd.

[57] ABSTRACT

An actuator arm assembly in which a spacer is designed to absorb a stress occurrable during a caulking operation so that the spacer will not be deformed. The actuator arm assembly includes a base; an actuator arm rotatably mounted on the base and having a first hole at one end thereof; a load beam supporting a magnetic head at one end thereof and having a second hole at the other end; and a spacer firmly secured to the other end of the load beam and fixedly caulked to the one end of the actuator arm. The spacer includes a flat portion, a cylindrical portion integral with the flat portion, and an annular groove formed between the cylindrical portion and the flat portion. An inner diameter of the cylindrical portion at its distal end portion is slightly smaller than the diameter of the caulking ball.

1 Claim, 15 Drawing Sheets

5,602,698

APPARATUS FOR MOUNTING A MAGNETIC HEAD IN AN ACTUATOR ARM ASSEMBLY

BACKGROUND OF THE INVENTION

1. Field of the Invention

The present invention relates generally to an actuator arm assembly for a magnetic disk unit, and particularly to a structure of a spacer which is used for combining an actuator arm and a load beam.

2. Description of the Related Art

Recently, a magnetic disk unit, as a kind of an external storage device for a computer, is being made smaller and thinner. Also, reduced consumption of electric power is required. Moreover, improvement of the recording density of a magnetic disk (hard disk) is demanded in order to fulfil the requirement for larger capacity, and therefore, the number of hard disks loaded in the unit are increased.

In a typical magnetic disk unit for a computer, a constant start and stop (CSS) system is generally employed to regulate the relation between a magnetic head and a hard disk. In this system, during rotation of the magnetic disk, the magnetic head floats a very small distance above the disk due to the balance between a floating force caused by an air flow generated by the disk rotating at a high speed and a load beam for urging the magnetic head against the magnetic disk. When the rotation of the magnetic disk is stopped, the magnetic head is brought to a contactable area on the magnetic disk. Physical contact between the magnetic head and the magnetic disk is realized at this contactable area. During the time when the magnetic disk has stopped rotating, the head and the disk are held in contact with each other.

The magnetic head is supported on a distal end of a load beam, and a basal end portion of the load beam is secured to a distal end of an actuator arm through a spacer. That is, by spot welding the basal end portion of the load beam to the spacer and fixedly caulking the spacer to the distal end of the actuator arm, the load beam is firmly secured to the distal end of the actuator. As one method for caulking the spacer to the distal end of the actuator arm, a caulking ball is inserted into a round hole formed in the spacer in order to forcibly spread a cylindrical portion of the spacer, to thereby caulk the spacer into a hole formed in the actuator arm. Conventionally, for performing this caulking work, the spacer is pressed with a jig so that the surface of the spacer will not be deformed by a force acting on the spacer during the caulking work.

Since a recent magnetic disk unit is made smaller and thinner, the mounting distance of magnetic disks is also reduced. As a consequence, the thickness of the actuator and spacer is reduced, too. The reduced distance between adjacent magnetic disks gives rise to a problem in that a jig for pressing the spacer can not be inserted between adjacent actuator arms, and even if the jig can be somehow inserted therebetween, the pressing force is insufficient.

Also, if a load beam provided with a Cu pattern wiring to supply and receive a signal to and from the magnetic head is employed, it becomes difficult to press the load beam with the pressing jig during a caulking operation because of the provision of the pattern wiring on the load beam. Therefore, it gives rise to a problem that the spacer becomes warped during the caulking operation and the load beam, which is secured to the spacer, is deformed, thus adversely affecting the floating characteristic of the magnetic head.

Deformation of the space will be explained with reference to FIGS. 18A and 18B. As shown in FIG. 18A, a pair of spacers 3 are inserted into a circular hole 1a formed in a distal end portion of an actuator arm 1, one from the top and the other from the bottom. Then, a caulking ball 5 is inserted into holes 3a formed in the spacers 3 in a direction as shown by an arrow A, and the spacers 3 are fixedly caulked to the actuator arm 1. At that time, in the conventional structure, the spacers 3 are badly warped generally in proportion to a reduced thickness of the spacers 3 as shown in FIG. 18B. The warping of the spacers 3 is particularly significant at the time when no pressing jig is used, or when a pressing force of the jig is weak.

SUMMARY OF THE INVENTION

It is, therefore, an object of the present invention to provide an actuator arm assembly for a magnetic disk unit, in which a spacer is designed to absorb stress occurrable during a caulking operation so that the spacer will not be warped.

In accordance with an aspect of the present invention, there is provided an actuator arm assembly for a magnetic disk unit including a base, comprising an actuator arm rotatably mounted on the base and having a first hole at one end thereof; a load beam supporting a magnetic head at one end thereof and having a second hole at the other end; and a spacer firmly secured to the other end of the load beam and fixedly caulked to the one end of the actuator arm, the spacer including a flat portion, a cylindrical portion integral with the flat portion, and an annular groove formed between the cylindrical portion and the flat portion.

A single or plurality of annular grooves may be formed in the flat portion of the spacer. In place of the annular groove or grooves, a plurality of linear grooves may be formed in the flat portion of the spacer.

In accordance with another aspect of the present invention, there is provided an actuator arm assembly for a magnetic disk unit including a base, comprising an actuator arm rotatably mounted on the base and having a first hole at one end thereof; a load beam supporting a magnetic head at one end thereof and having a second hole at the other end; and a spacer firmly secured to the other end of the load beam and fixedly caulked to the one end of the actuator arm, the spacer including a flat portion, a cylindrical portion integral with the flat portion, and a reinforcement rib formed on an outer periphery of the flat portion.

Preferably, a distance between the reinforcement ribs formed on opposite sides of the spacer is generally equal to the width of the distal end of the actuator arm.

According to the present invention, since stress occurrable during the caulking operation can be absorbed by the annular groove portion or linear groove portion formed in the spacer, the deformation of the spacer caused by caulking can be prevented. As a consequence, the load beam, which is secured to the spacer, is not deformed, and the floating characteristic of the magnetic head can be prevented from being adversely affected, by caulking the load beam to the actuator arm.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
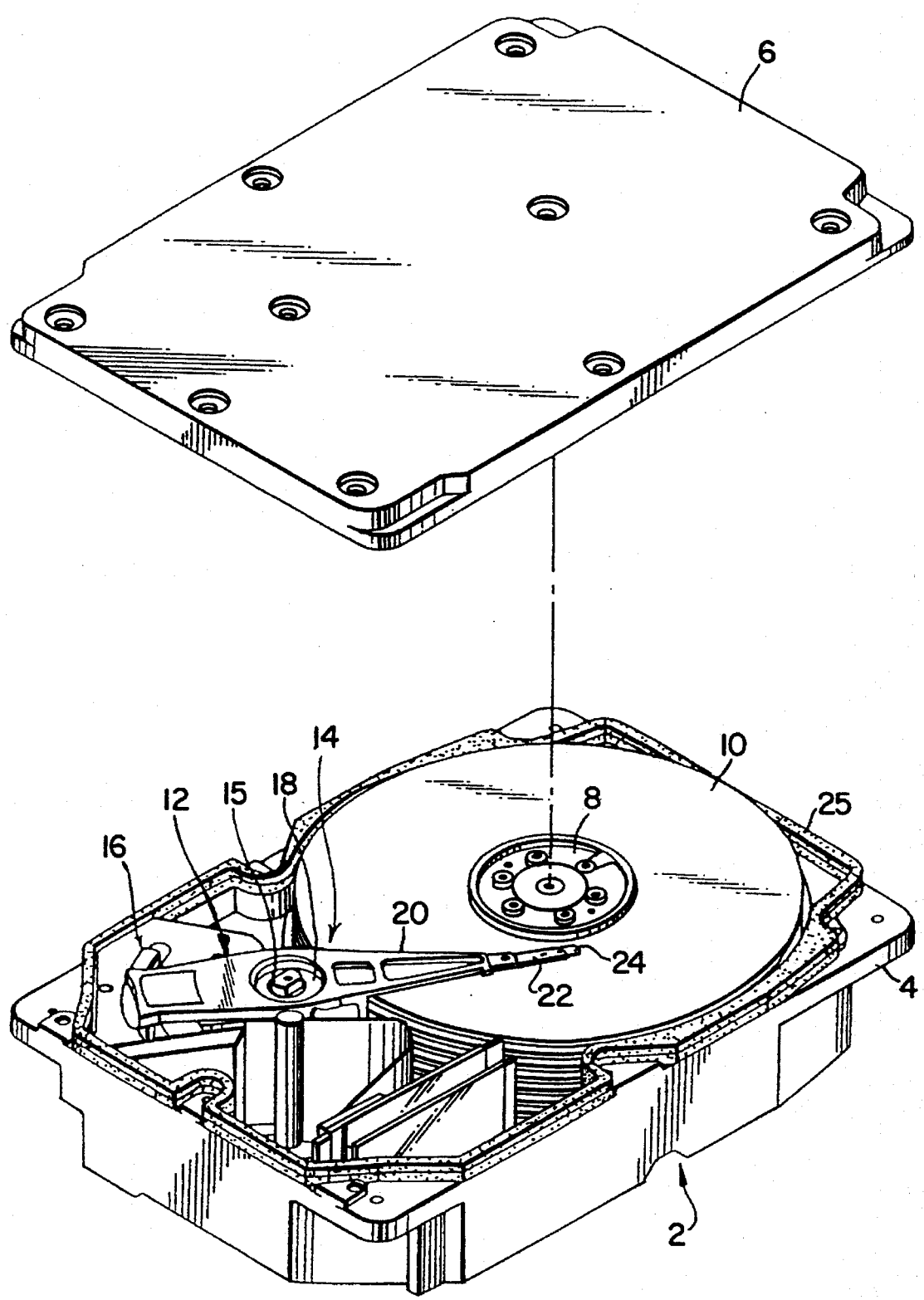
FIG. 1 is a schematic perspective view of a magnetic unit.

Referring to FIG. 1, there is depicted a perspective view of a magnetic disk unit in which an actuator arm assembly of the present invention is employed. Reference numeral 2 denotes a housing (enclosure) which comprises a base 4 and a cover 6. On the base, there is provided a spindle hub 8 which is driven for rotation by an inner hub motor not shown. Magnetic disks 10 and spacers, not shown, are alternately inserted in the spindle hub 8. In this way, the magnetic disks 10 are mounted on the spindle hub 8 with predetermined spaces.

Figure 2:
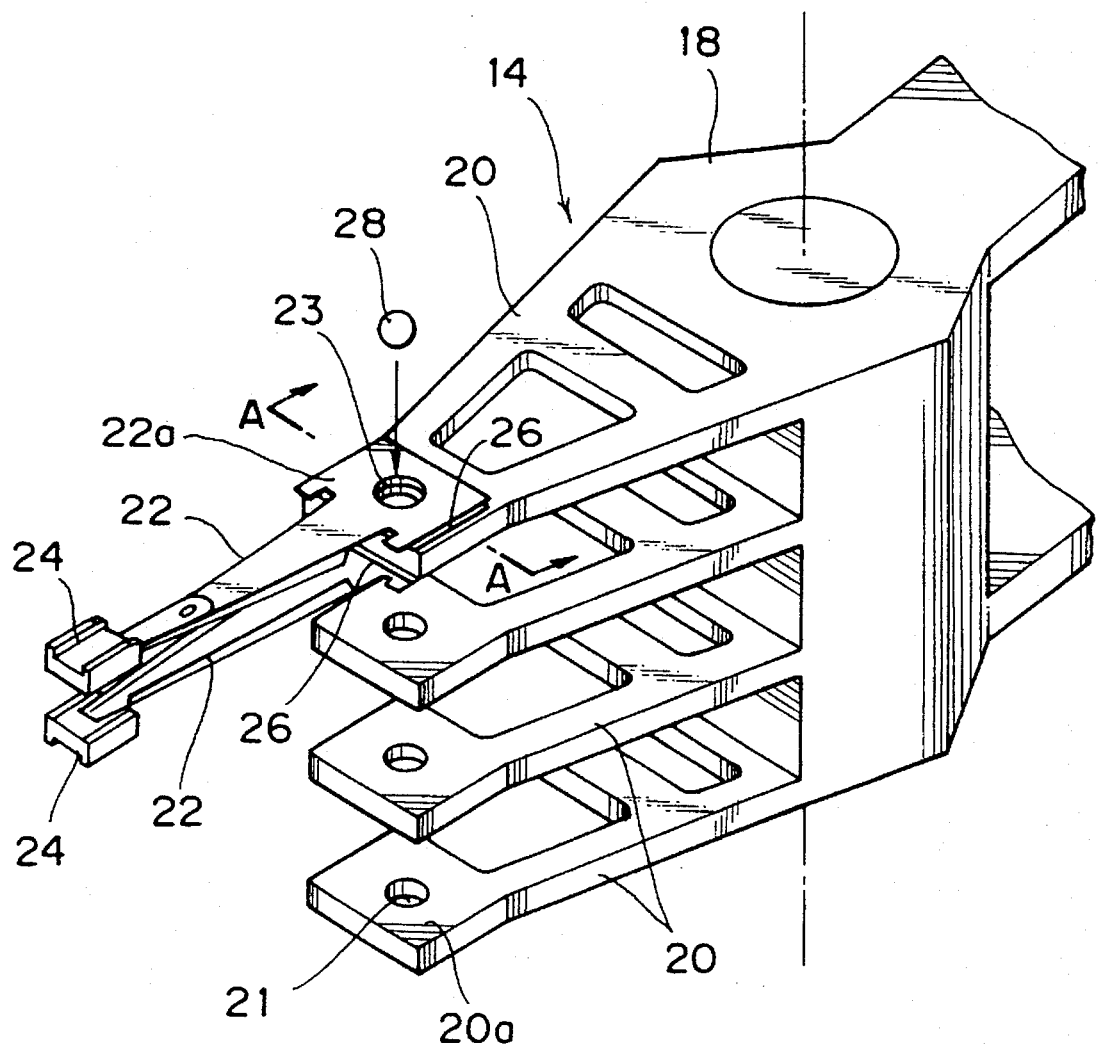
FIG. 2 is a schematic perspective view of an actuator arm assembly.
Figure 3:
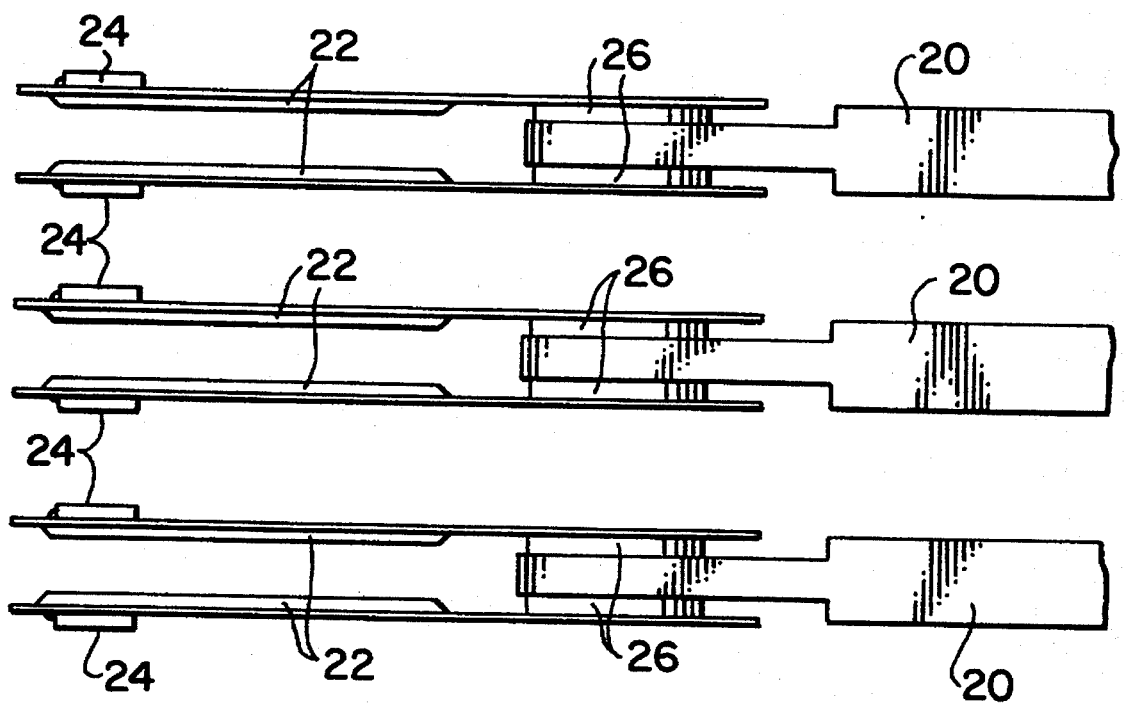
FIG. 3 is a schematic side view of the actuator arm assembly.

Reference numeral 12 denotes a rotary type actuator assembly which comprises an actuator arm assembly 14 and a magnetic circuit 16. The actuator arm assembly 14 includes an actuator block 18 rotatably mounted on a shaft 15 which is secured to the base 4. As best shown in FIG. 2, the actuator block 18 has a plurality of actuator arms 20 integral therewith. Basal end portions 22a of a pair of load beams 22, which load beams 22 each supporting a magnetic head 24 at distal ends thereof, are fixedly caulked to a distal end portion 20a of each actuator arm 20 through spacers 26 (see FIG. 3). Reference numeral 25 denotes an annular packing adapted to seal the inside of the magnetic disk unit.

A circular hole 21 having a larger inner diameter than the diameter of a caulking ball 28 is formed in the distal end portion 20a of each actuator arm 20. Also, a circular hole 23 having a larger inner diameter than the diameter of the caulking ball 28 is formed in the basal end portion 22a of each load beam 22. Before the spacers 26 are caulked to the actuator arms 20, the basal end portions 22a of the load beams 22 are spot welded to the spacers 26, respectively. The actuator arms 20, load beams 22 and spacers 26 are formed of stainless steel. Instead of spot welding, the spacers 26 may be secured to the load beams 22 by adhesive agent.

Figure 4:
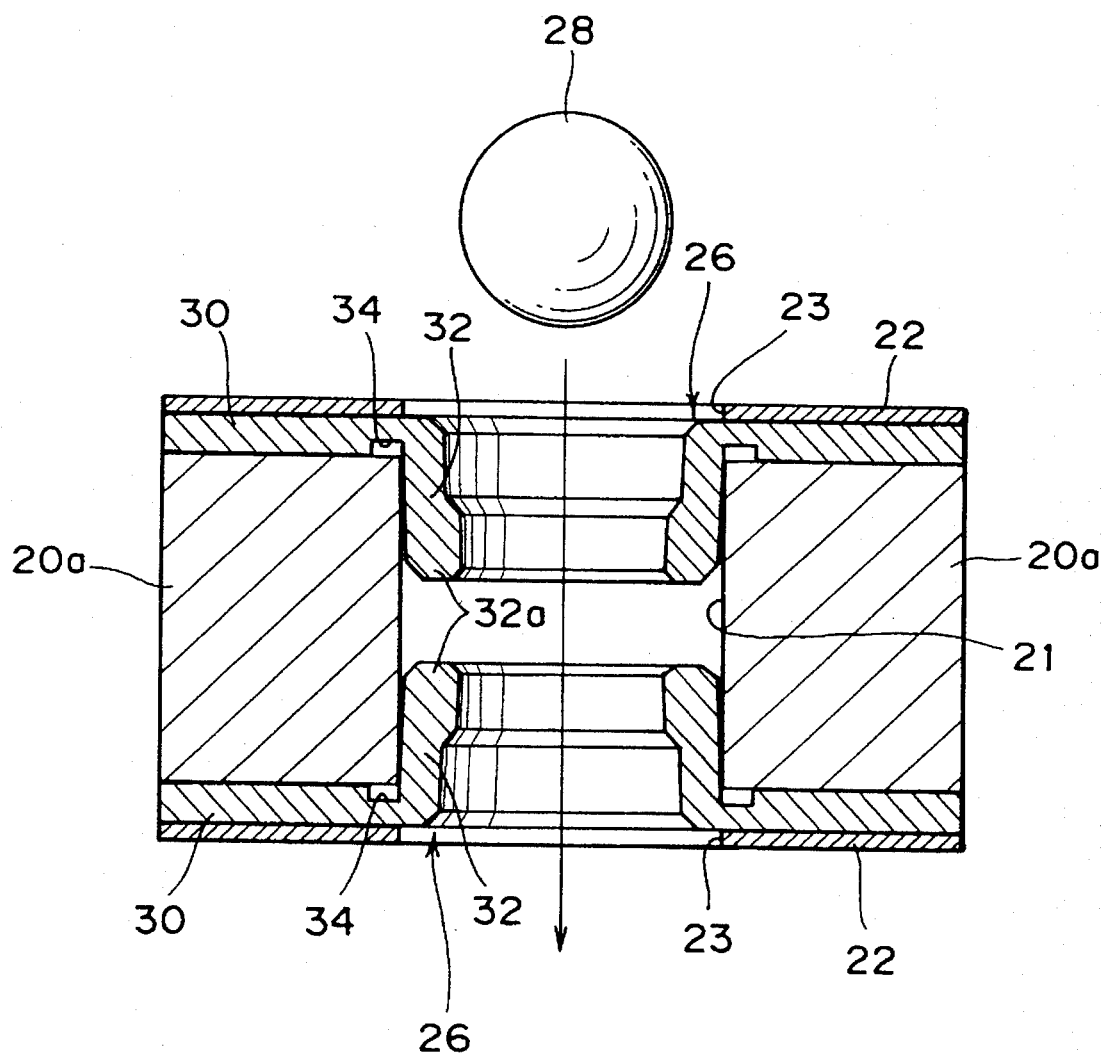
FIG. 4 is a cross-sectional view taken on line A—A of FIG. 2.

The spacers 26 with the load beams 22 firmly secured thereto are fixedly caulked to the actuator arms 20 in the following manner. As shown in FIG. 4, a pair of spacers 26 are inserted into the circular hole 21 which are formed in the distal end portion 20a of the actuator arm 20, one from the top and the other from the bottom. Each spacer 26 includes a flat portion 30, and a cylindrical portion 32 integral with the flat portion 30. And the cylindrical portion 32 is inserted in the circular hole 21.

Figure 6A:
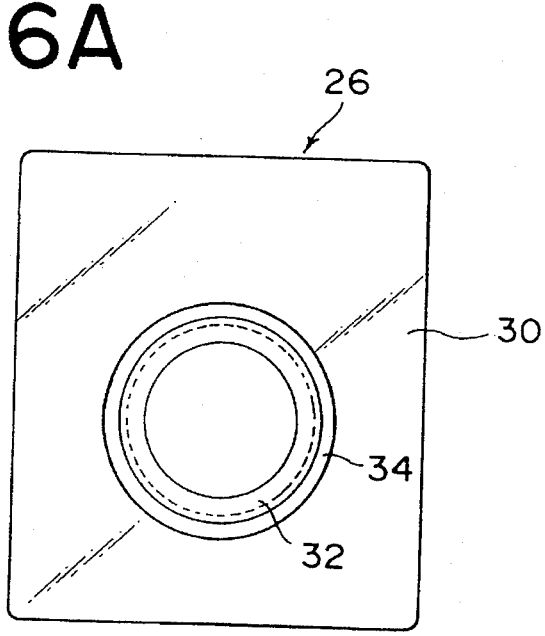
FIG. 6A is a plan view of a spacer according to a first embodiment.
Figure 6B:
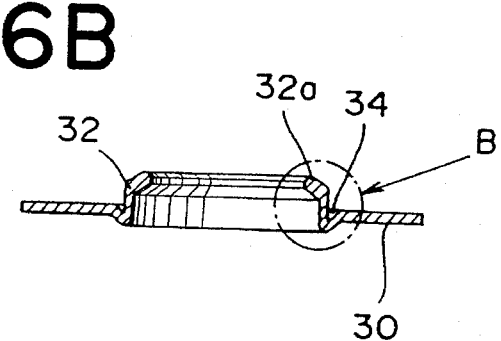
FIG. 6B is a cross-sectional view of FIG. 6A.
Figure 7:
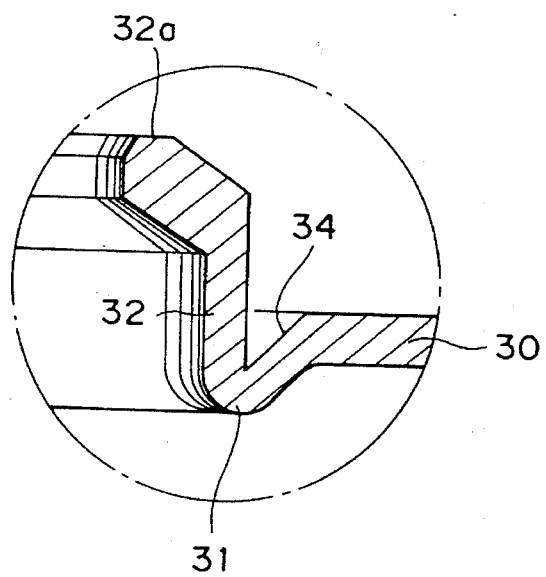
FIG. 7 is an enlarged view of a part of FIG. 6B.

As will be apparent from FIGS. 6A and 6B, an annular groove 34 is formed between the flat portion 30 and the cylindrical portion 32. More specifically, as most clearly shown in the enlarged view of FIG. 7, the flat portion 30 and the cylindrical portion 32 are connected to each other through a bent portion 31, and the annular groove 34 is formed in this bent portion 31. The inner diameter of the distal end portion 32a of the cylindrical portion 32 is slightly smaller than the diameter of the caulking ball 28.

Figure 5:
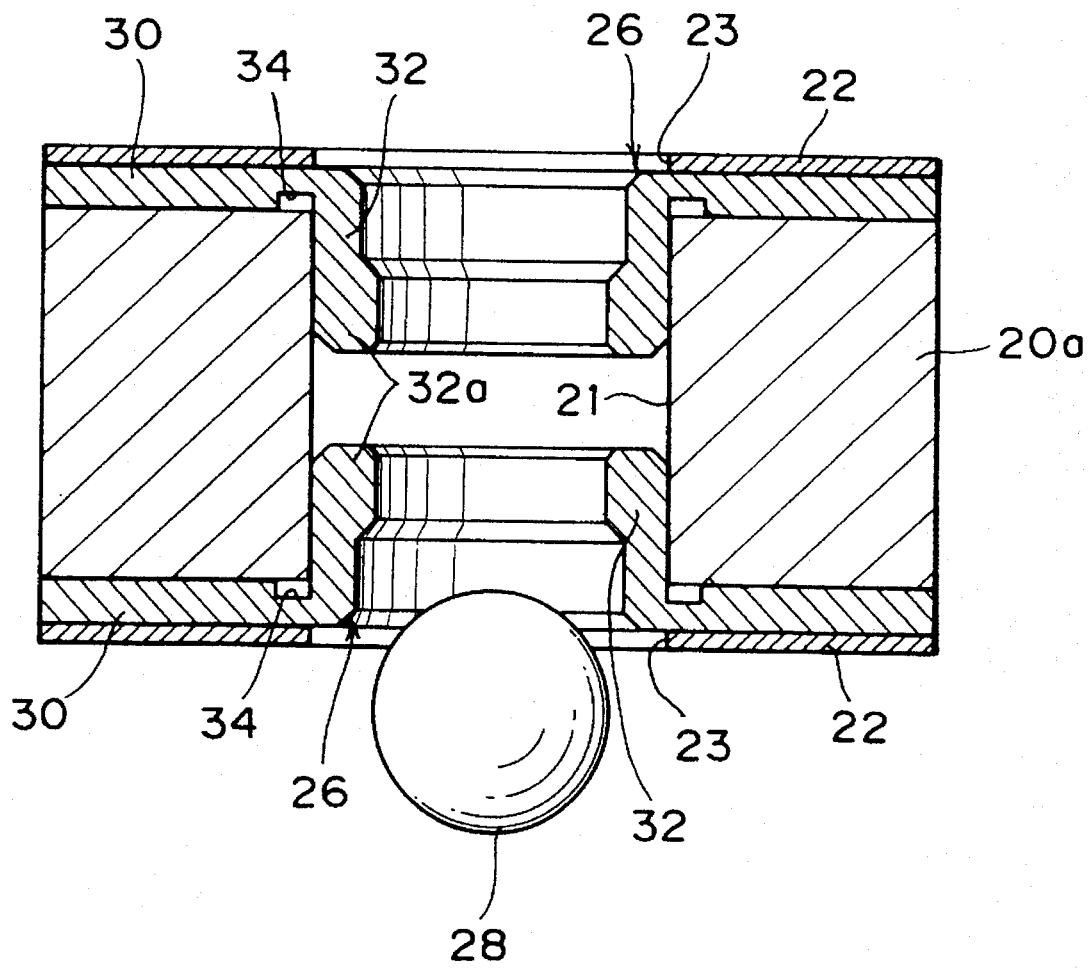
FIG. 5 is likewise a cross-sectional view taken on line A—A of FIG. 2 but showing a state after a caulking operation is performed.

As shown in FIG. 4, the caulking ball 28 is passed in the direction as shown by an arrow, i.e., from top to bottom. Then, as shown in FIG. 5, the distal end portions 32a of the cylindrical portions 32 of the respective spacers 26 are forcibly spread by the caulking ball 28 and firmly attached to a wall portion which defines the hole 21 of the actuator arm 20 resulting in the spacers 26 being firmly caulked to the distal end portion 20a of the actuator arm 20. Since a stress applied to the spacers 26 during the caulking operation is absorbed by the annular grooves 34, the spacers 26 are not deformed. Consequently, according to this embodiment, the floating characteristic of the magnetic head is not adversely affected by caulking the spacer 26 to the actuator arm 20.

Figure 8A:
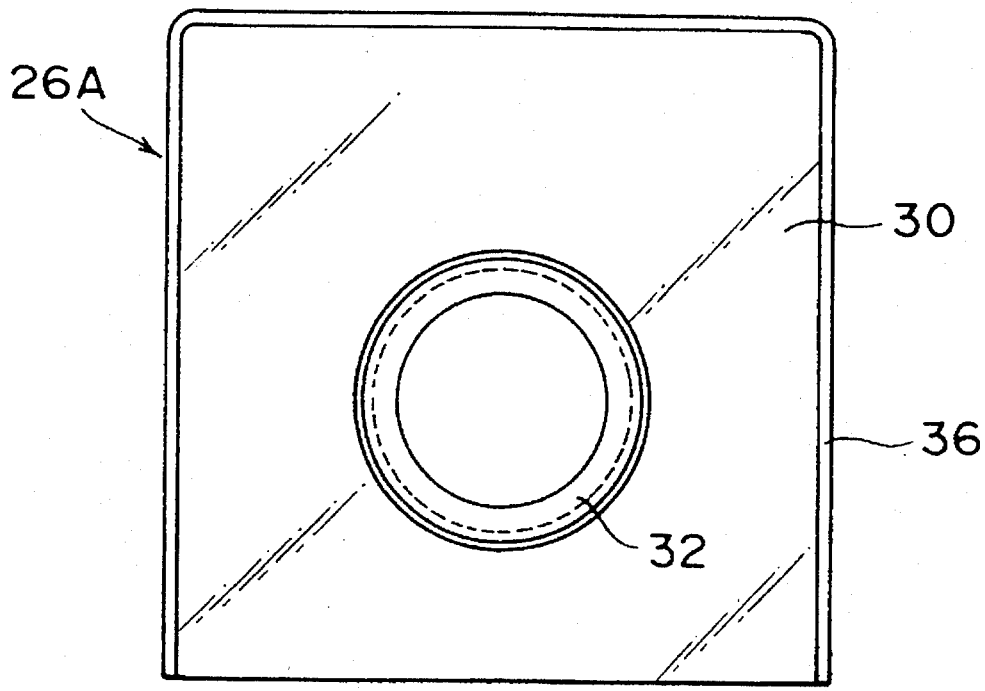
FIG. 8A is a plan view of a spacer according to a second embodiment.
Figure 8B:
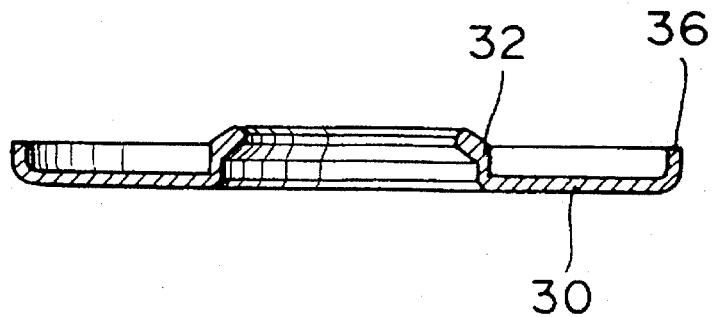
FIG. 8B is a cross-sectional view thereof.

FIGS. 8A and 8B show a spacer according to the second embodiment. FIG. 8A is a plan view, and FIG. 8B is a cross-sectional view. A spacer 26A of this embodiment has a reinforcement rib 36 integral therewith and extending along all sides, excepting one side, of the flat portion 30. Since the spacer 26A of this embodiment has the reinforcement rib 36, the reinforcement rib 36 acts against a stress occurrable to the spacer during the caulking operation and as a result, the spacer 26A can be prevented from being warped.

Figure 9A:
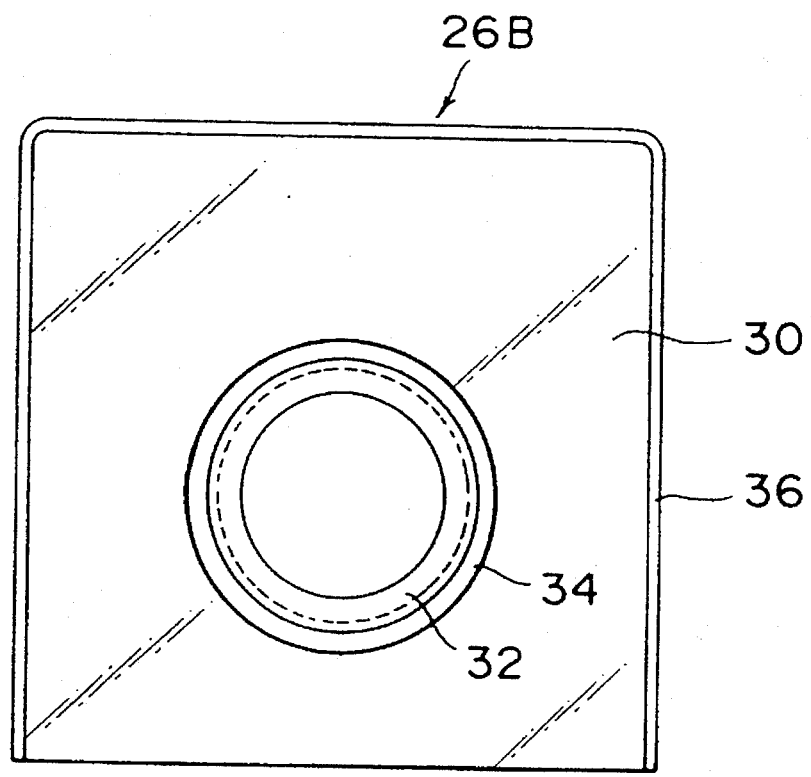
FIG. 9A is a plan view of a spacer according to a third embodiment.
Figure 9B:
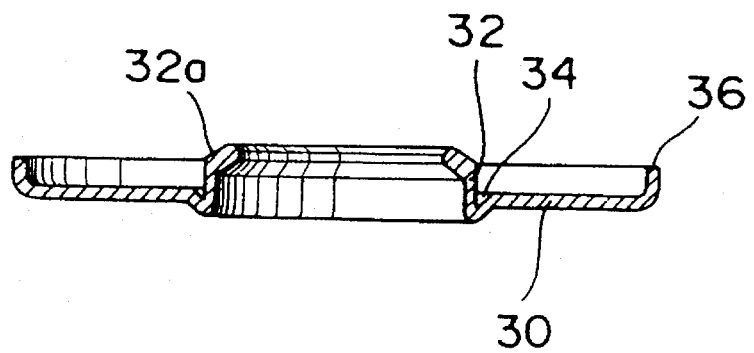
FIG. 9B is a cross-sectional view thereof.

Referring to FIGS. 9A and 9B, a spacer according to the third embodiment of the present invention will be described. This spacer 26B has the annular groove 34 of the first embodiment and the reinforcement rib 36 of the second embodiment. Therefore, a stress occurrable to the spacer 26B during the caulking operation is absorbed by the annular groove 34 and also resisted by the reinforcement rib 36. As a consequence, in the spacer 26B of this embodiment, deformation of the spacer 26B hardly occurs during the caulking operation.

Figure 10:
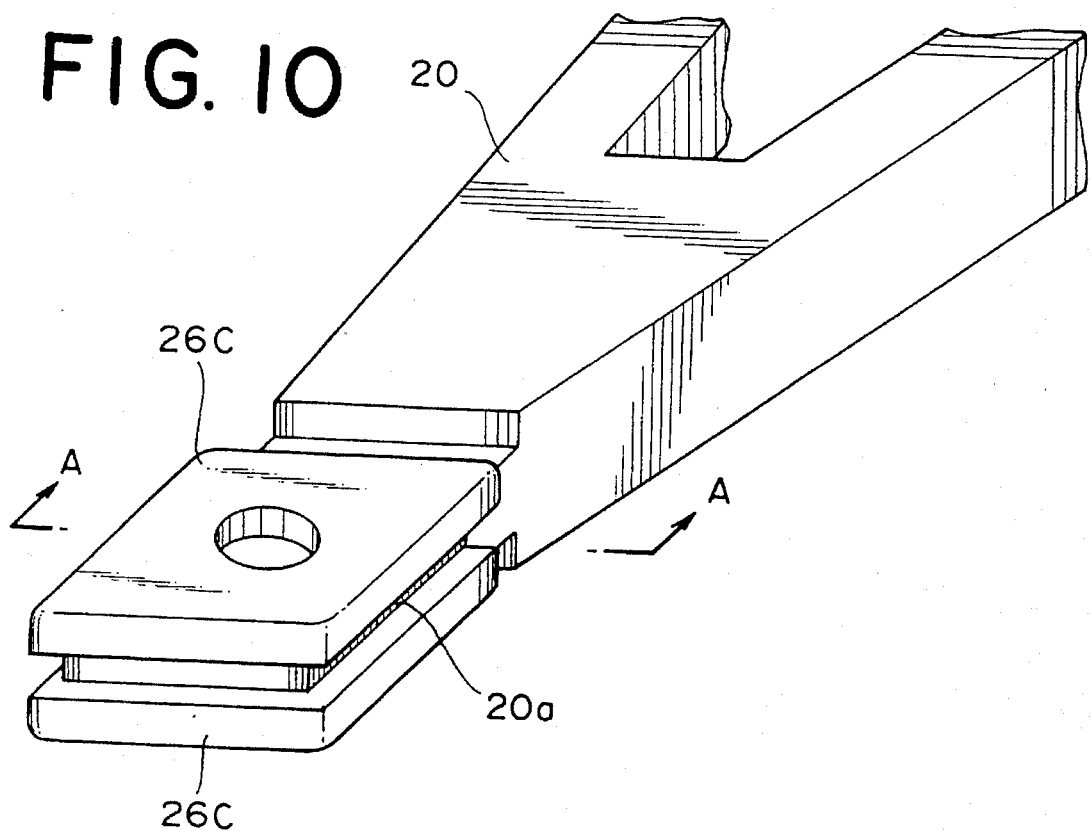
FIG. 10 is a perspective view of an actuator arm fixedly caulked to a distal end of a spacer according to a fourth embodiment.
Figure 11:
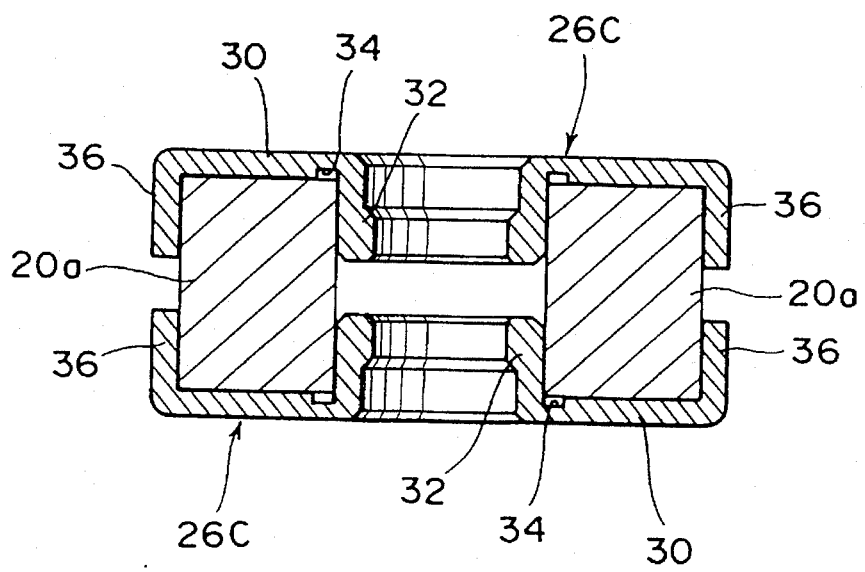
FIG. 11 is a cross-sectional view taken on line A—A of FIG. 10.

FIG. 10 depicts a perspective view of an actuator arm with a pair of spacers according to the fourth embodiment fixedly caulked to a distal end thereof. FIG. 11 depicts a cross-sectional view taken on line A—A of FIG. 10. A spacer 26C of this embodiment is modified embodiment of the above-mentioned third embodiment. As will be apparent from FIG. 11, a distance or space between reinforcement rib 36 formed on opposite sides of each spacer 26C is generally equal to the width of the distal end portion 20a of the actuator arm 20. Owing to this arrangement, the spacers 26C can be effectively prevented from being rotated during the time the spacers 26C are caulked to the actuator arm 20.

Figure 12A:
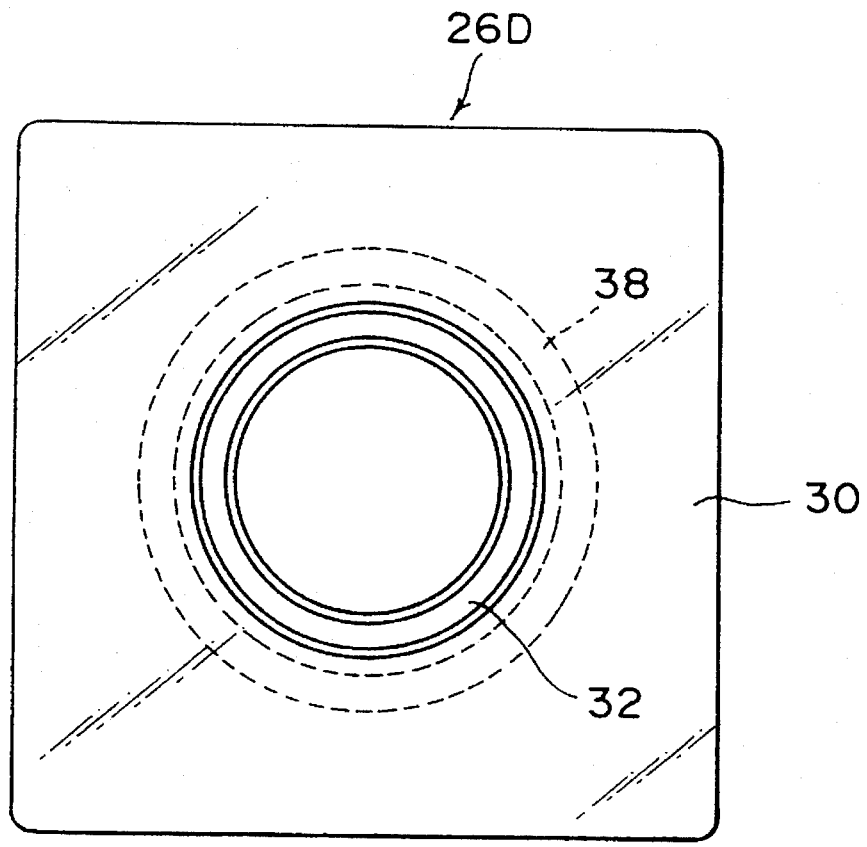
FIG. 12A is a plan view of a spacer according to a fifth embodiment.
Figure 12B:
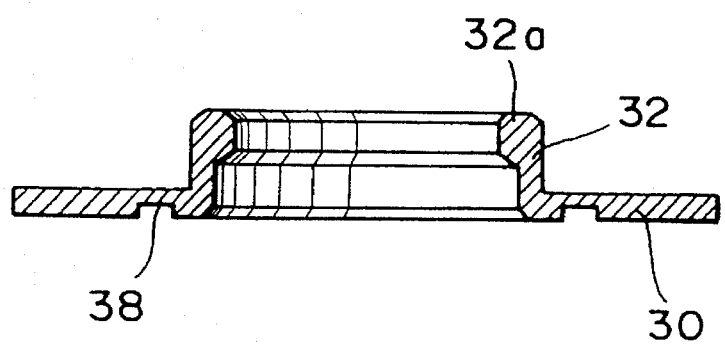
FIG. 12B is a cross-sectional view of FIG. 12A.

FIGS. 12A and 12B show a spacer 26D according to the fifth embodiment of the present invention. This spacer 26D has an annular groove 38 formed in a lower surface of the flat portion 30. A stress occurrable to the spacer 26D during the caulking operation is absorbed by this annular groove 38, and therefore, the spacer 26D can be prevented from being deformed.

Figure 13A:
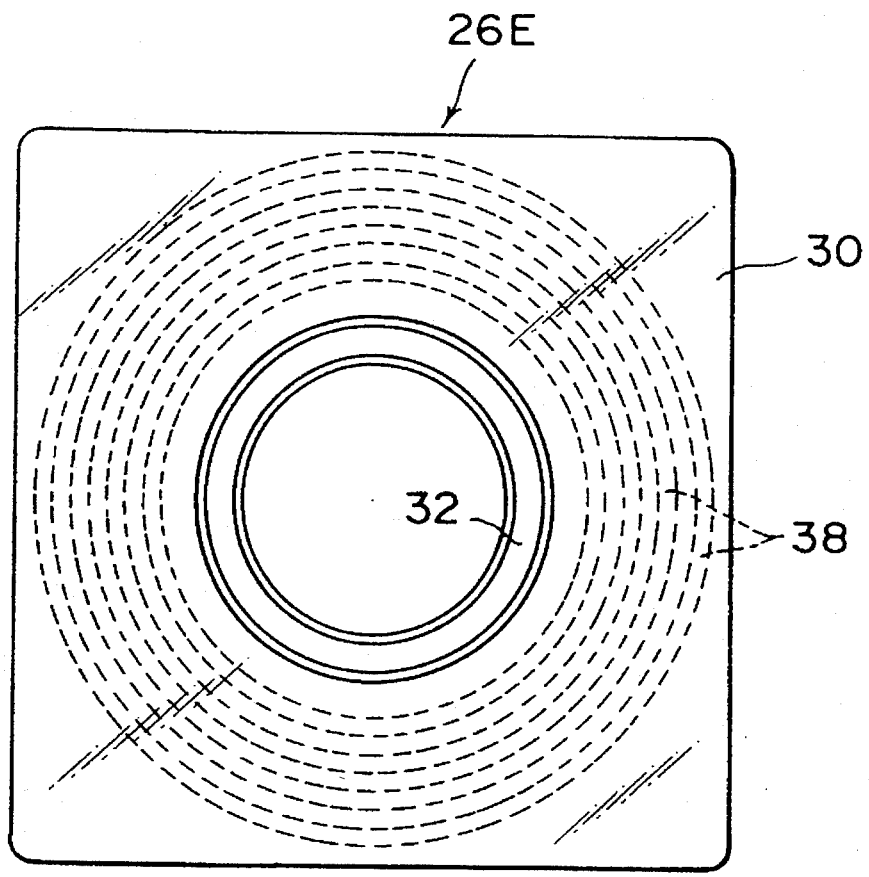
FIG. 13A is a plan view of a spacer according to a sixth embodiment.
Figure 13B:
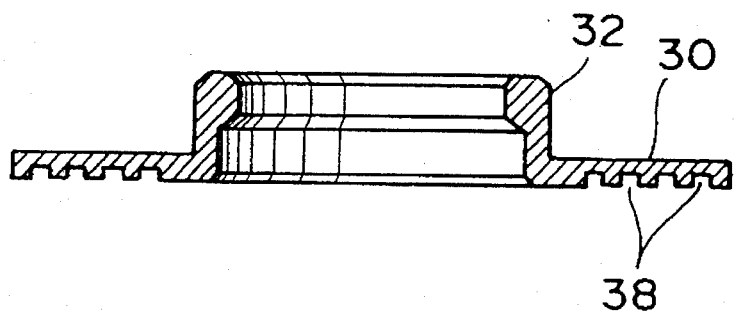
FIG. 13B is a cross-sectional view of FIG. 13A.

FIGS. 13A and 13B depict a spacer 26E according to the sixth embodiment of the present invention. The spacer 26E of this embodiment has a plurality of annular grooves 38 formed in the lower surface of the flat portion 30. A stress occurrable during the caulking operation is absorbed by those annular grooves 38.

Figure 14A:
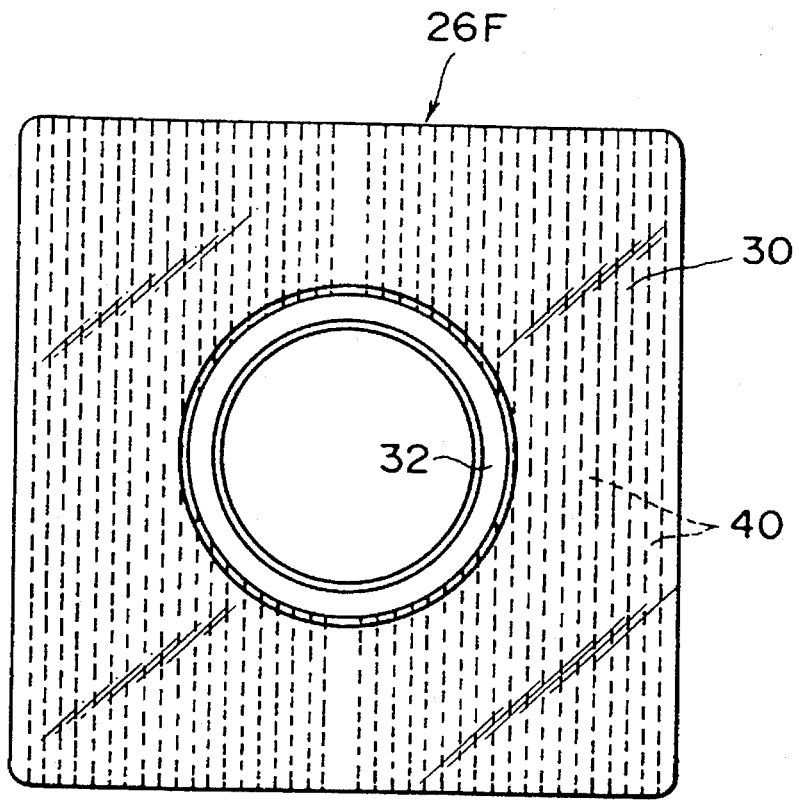
FIG. 14A is a plan view of a spacer according to a seventh embodiment.
Figure 14B:
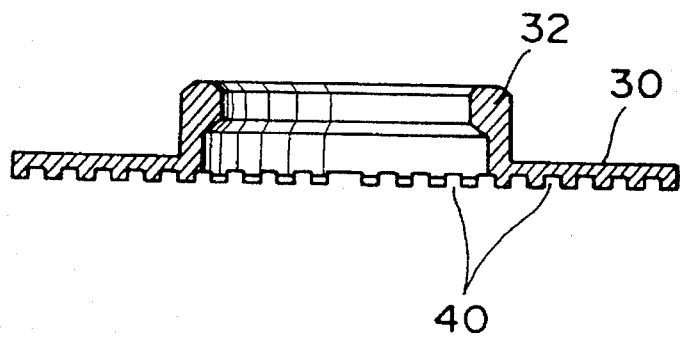
FIG. 14B is a cross-sectional view of FIG. 14A.
Figure 15:
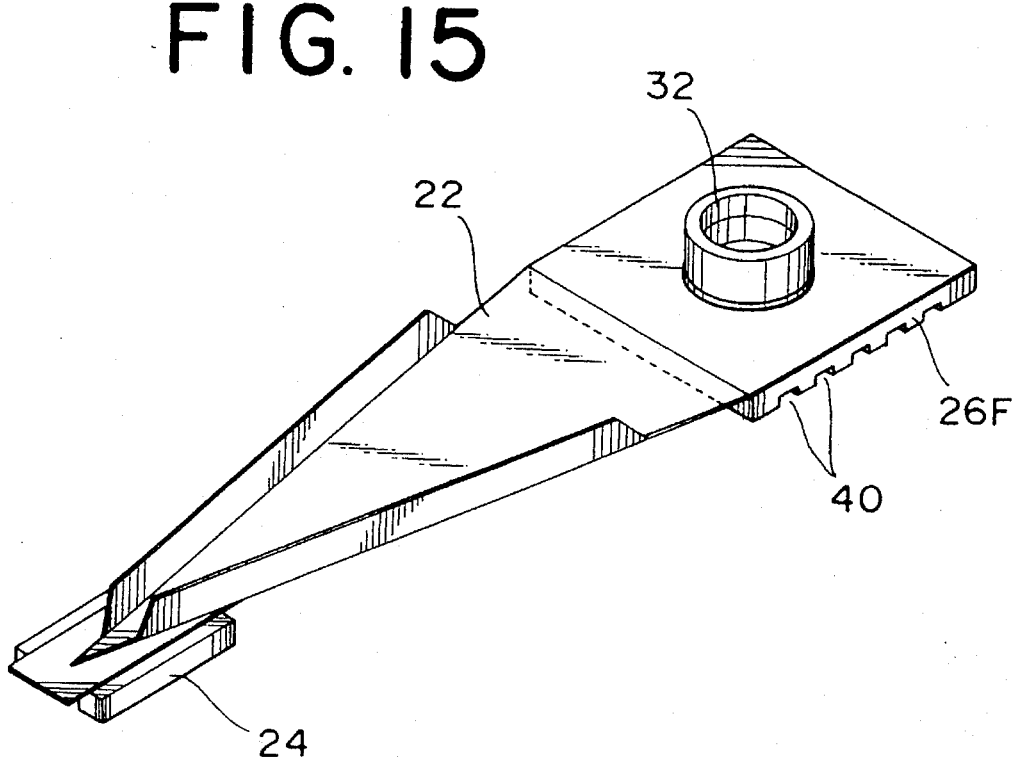
FIG. 15 is a perspective view showing the spacer according to the seventh embodiment, firmly secured to a load beam.

FIGS. 14A and 14B depict a spacer 26F according to the seventh embodiment of the present invention. The spacer 26F of this embodiment has a plurality of linear grooves 40 formed in the lower surface of the flat portion 30. A stress occurrable during the caulking operation is absorbed by those grooves 40. FIG. 15 depicts a perspective view of the spacer 26F according to the seventh embodiment firmly secured to the load beam 22. In the case where the grooves 40 are formed in the lower surface of the spacer 26F, the load beam 22 is spot welded to an upper surface of the spacer 26F.

Figure 16:
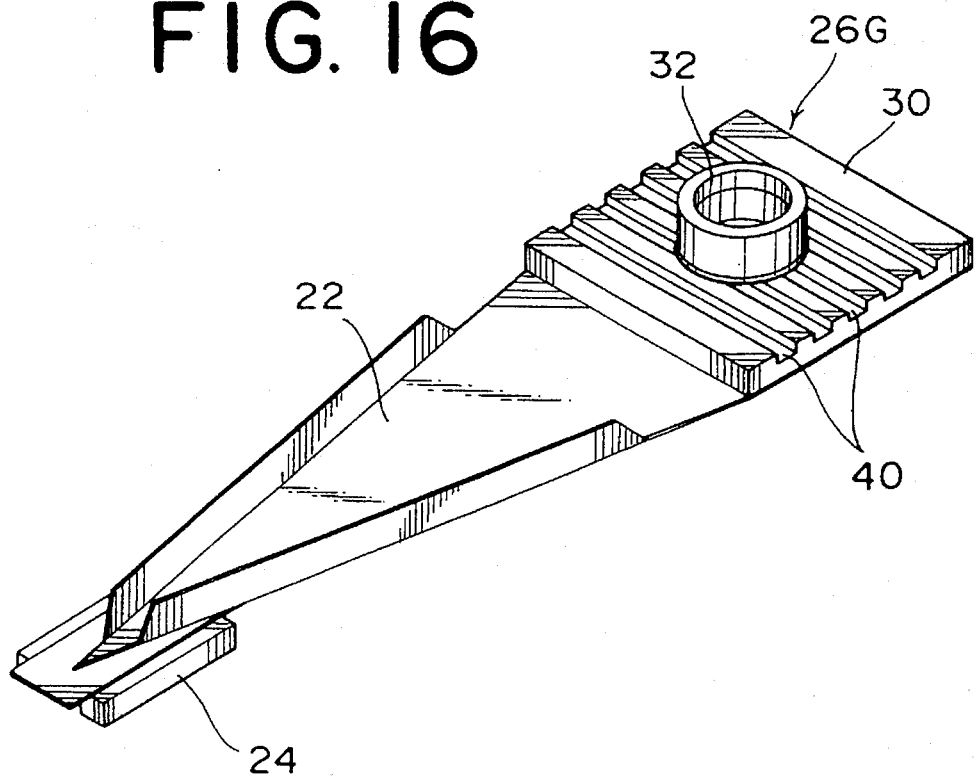
FIG. 16 is a perspective view showing a spacer according to an eighth embodiment, firmly secured to a load beam.

FIG. 16 depicts a perspective view of a spacer 26G according to an eighth embodiment of the present invention, firmly secured to the load beam 22. The spacer 26G of this embodiment has a plurality of linear grooves 40 formed in the upper surface of the flat portion 30. In the case where the grooves 40 are formed in the upper surface of the flat portion 30, the load beam 22 is spot welded to the lower surface of the spacer 26G.

Figure 17A:
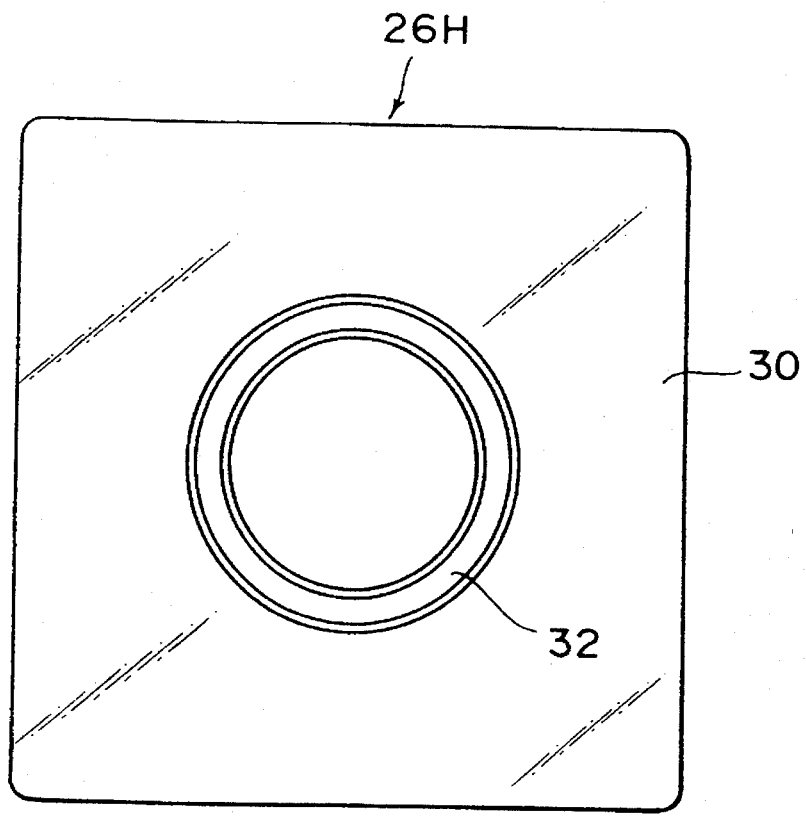
FIG. 17A is a plan view of a spacer according to a ninth embodiment.
Figure 17B:
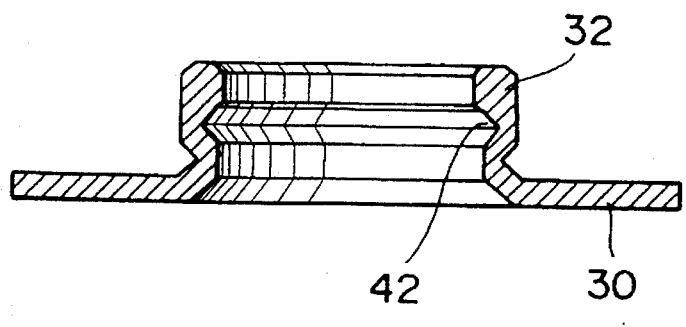
FIG. 17B is a cross-sectional view of FIG. 17A.
Figure 18A:
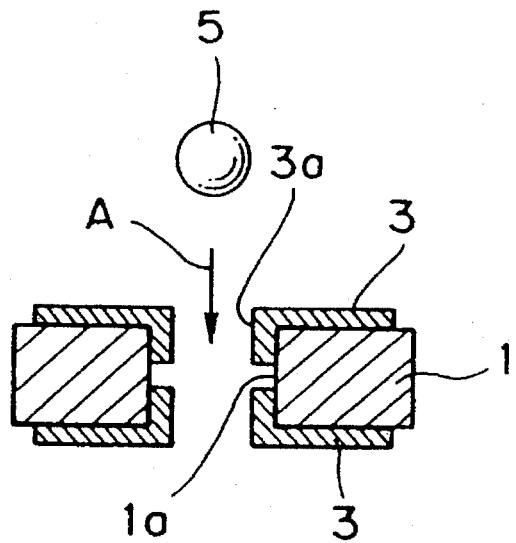
FIGS. 18A and 18B are views for explaining the problems inherent in the prior art device.
Figure 18B:
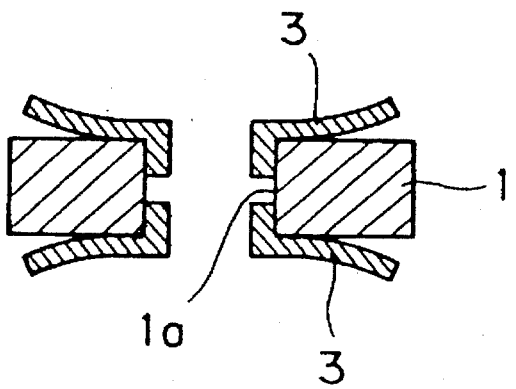

FIGS. 17 and 17B depict a spacer 26H according to the ninth embodiment of the present invention. The spacer 26H of this embodiment has an annular groove 42 formed in an inner periphery of the cylindrical portion 32. A stress occurrable to the spacer 26H during the caulking operation is absorbed by this annular groove 42. With respect to the above-mentioned various spacers, the grooves are formed by cutting with a lathe or by pressing. In case of a complicated shape, the grooves may be formed by etching.

As described in detail, according to the present invention, since a stress occurrable to the spacers during the time the spacers are fixedly caulked to the actuator arm can be effectively absorbed by the spacers themselves, the spacers are never deformed during the caulking operation. As a consequence, deformation of the load beam can be prevented, and the floating characteristic of the magnetic head is not deteriorated. Furthermore, since the present invention employ spacers having special shapes, the load beam can be fixedly caulked to the actuator arm through the spacers without a need of the use of a pressing jig.

What is claimed is:

1. An actuator arm assembly for a disk unit including a base, comprising:

an actuator arm having a first end, said actuator arm rotatably mounted on the base and defining a first hole at said first end;

a load beam having a first and second end, said load beam supporting a head at said first end and defining a second hole at said second end; and a spacer firmly secured to said second end of said load beam and fixedly caulked to said first end of said actuator arm, said spacer including a flat portion, a cylindrical portion integral with said flat portion, and an annular groove formed between said cylindrical portion and said flat portion, said spacer including a reinforcement rib integral to and having portions extending from at least two sides of a peripheral edge of said flat portion, so that said first end of said actuator arm is arranged between said portions of said rib extending from said at least two sides of said peripheral edge of said flat portion.

* * * * *